(12) United States Patent
Bottcher

(10) Patent No.: US 9,599,192 B2
(45) Date of Patent: Mar. 21, 2017

(54) DRIVE WITH TRANSMISSION SYSTEM

(71) Applicant: Manfred Bottcher, Weddelbrook (DE)

(72) Inventor: Manfred Bottcher, Weddelbrook (DE)

(*) Notice: Subject to any disclaimer, the term of this patent is extended or adjusted under 35 U.S.C. 154(b) by 0 days.

(21) Appl. No.: 14/347,879

(22) PCT Filed: Sep. 25, 2012

(86) PCT No.: PCT/DE2012/000942
§ 371 (c)(1),
(2) Date: Mar. 27, 2014

(87) PCT Pub. No.: WO2013/044900
PCT Pub. Date: Apr. 4, 2013

(65) Prior Publication Data
US 2014/0230592 A1 Aug. 21, 2014

(30) Foreign Application Priority Data

Sep. 28, 2011 (DE) .......................... 10 2011 114 464

(51) Int. Cl.
*H02K 7/116* (2006.01)
*F16H 1/00* (2006.01)
*F16H 1/22* (2006.01)

(52) U.S. Cl.
CPC .............. *F16H 1/00* (2013.01); *F03D 15/00* (2016.05); *F16H 1/22* (2013.01);
(Continued)

(58) Field of Classification Search
CPC ..... F16H 1/00; F16H 1/22; F16H 1/46; F16H 1/227; F16H 1/2836; F16H 37/08;
(Continued)

(56) References Cited

U.S. PATENT DOCUMENTS 1,459,964 A 6/1923 Alquist
1,817,216 A * 8/1931 Robert ...................... F16H 1/18
310/83
(Continued)

FOREIGN PATENT DOCUMENTS

CN 201221591 4/2009
DE 4329495 3/1995
(Continued)

*Primary Examiner* — William Kelleher
*Assistant Examiner* — Jake Cook
(74) *Attorney, Agent, or Firm* — Diederiks & Whitelaw, PLC

(57) ABSTRACT

A transmission system includes a first gear which has an outer toothing; a plurality of pinions which mesh with the outer toothing of the first gear, each pinion being connected to an electric machine which is designed as a motor or a generator; a second gear which is coaxially connected to the first gear and which has an outer toothing; a plurality of third gears which mesh with the second gear and which have an outer toothing, each of the third gears being coaxially connected to a fourth gear which has an outer toothing; and a fifth gear which meshes with the fourth gears, which is connected to a drive or output shaft, and which has an outer toothing, with the first gear and the drive or output shaft being coaxially arranged.

14 Claims, 1 Drawing Sheet

(52) U.S. Cl.
CPC ..... *F05B 2260/4031* (2013.01); *Y02E 10/722* (2013.01); *Y10T 74/19684* (2015.01)

(58) Field of Classification Search
CPC .. F16H 37/065; F16H 37/0833; F16H 57/082; F16H 57/0476; F16H 57/0479; F16H 3/46; F16H 3/72; F03D 11/00; F03D 11/02; F03D 11/024; F05B 2260/40311; F05B 2260/4031; F16C 17/12; F16C 33/1095
USPC .......................................... 74/421 A, 421 R
See application file for complete search history.

(56) References Cited

U.S. PATENT DOCUMENTS

| | | | | |
|---|---|---|---|---|
| 1,820,061 | A * | 8/1931 | Flagg | F16H 1/28 475/331 |
| 4,080,847 | A * | 3/1978 | Thomas | F16H 3/74 475/254 |
| 5,222,924 | A * | 6/1993 | Shin | F03D 11/02 416/124 |
| 5,261,289 | A * | 11/1993 | Birch | F16H 1/20 74/413 |
| 5,463,914 | A | 11/1995 | Tyan | |
| 6,379,276 | B1 * | 4/2002 | Cheng | F16H 37/0826 475/330 |
| 6,926,636 | B2 * | 8/2005 | Luper | F16H 3/72 475/152 |
| 8,720,291 | B2 * | 5/2014 | Moufawad | F16H 3/74 475/170 |
| 2006/0138780 | A1 * | 6/2006 | Flamang | F03D 11/02 290/55 |
| 2010/0303626 | A1 * | 12/2010 | Mostafi | F03D 11/02 416/170 R |

FOREIGN PATENT DOCUMENTS

| | | |
|---|---|---|
| GB | 2429342 | 2/2007 |
| WO | WO 00/65708 | 11/2000 |

* cited by examiner

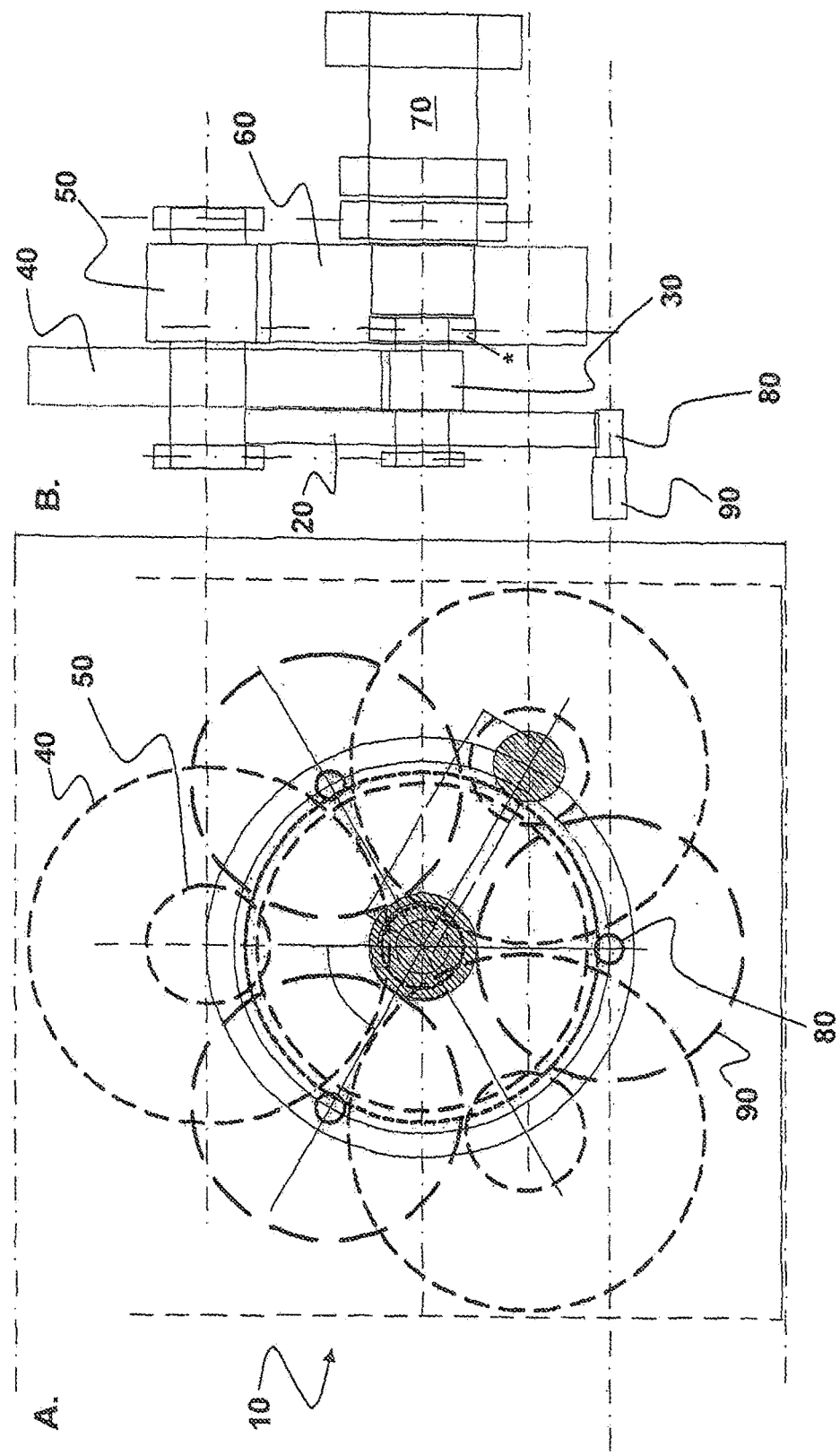

DRIVE WITH TRANSMISSION SYSTEM

CROSS-REFERENCE TO RELATED APPLICATIONS

This application represents a National Stage application of PCT/DE2012/000942 entitled "Drive with Transmission System" filed Sep. 25, 2012, pending.

BACKGROUND OF THE INVENTION

The invention relates to a transmission system.

Transmission systems are, for example in the case of wind turbines, motor vehicles, and in rolling mills, often designed as planetary transmission systems. The planetary transmission systems already known here exhibit a ring gear that exhibits an inner toothing and on which, lying on the inside, at least two planetary gears mesh that are attached to a planet carrier, exhibit an outer toothing and create a transmission ratio to the sun gear that is arranged coaxially relative to the ring gear and exhibits an outer toothing.

U.S. Pat. No. 1,459,964 discloses a transmission system where an input shaft is concentric to an output shaft, all gears having an outer toothing. WO 00/65708 A1 discloses a transmission system where a plurality of pinions connected to an electric machine mesh with a first gear.

SUMMARY OF THE INVENTION

It is the object of the invention to provide a transmission system that enables manufacture within tight tolerances in conjunction with a compact construction and is subject to only little wear in conjunction with a very quiet run.

In the invention, the gear of the first stage, i.e. the first gear, and the gear of the third stage, i.e. the fifth gear, are arranged concentrically, the gears meshing with the gears of the first and third stages, i.e. the third and fourth gears, being at equal distance from the axes of the gears, mentioned above, of the first and third stages and form an isosceles triangle.

The axes of the third and fourth gears are concentric to the axes of the pinions of the electric machines, the axes of the third and fourth gears being in each case arranged in the angle bisector between the axes of the pinions.

Here the third gears, and the fourth gears coaxially connected to the third gears, are arranged such that the third gears engage the second gear and the fourth gears engage the fifth gear.

If the transmission ratio of stages 2 and 3 is selected below a ratio of 5.40:1, adaptation of the total transmission ratio can take place via the first stage that can be set independently of the axis spacing.

If the gears are preferably designed to be helically toothed and if the first and second gears are particularly preferably mounted in the housing wall on the one hand and in a bearing, arranged in the fifth gear, on the other hand, forces having an unfavourable effect on the transmission system can be avoided.

In particular it is provided that the gears of the first and third stages, i.e. the gear groups that are formed by the pinion of the electric machine and the first gear, the second gear with the third gear and the fourth with the fifth gear, exhibit such a counter-rotating helical toothing that the axial forces that results from the helical toothing of the gears cancel each other.

As a result, the entire transmission system and eventually also the transmission-system housing can be provided with smaller dimensions relative to the mounting of the gears.

DETAILED DESCRIPTION OF THE DRAWINGS

The transmission system 10 exhibits a centrally mounted first gear 20 that is firmly connected to a second gear arranged behind the first gear 20, so that in operation the first and the second gears 20, 30 rotate at the same speed. The second gear 30 in particular exhibits a smaller diameter than the first gear 20.

DETAILED DESCRIPTION OF THE INVENTION

The second gear 30 meshes with three third gears 40 that are arranged in an imaginary isosceles triangle, that in turn are firmly connected in each case to a fourth gear 50 that is smaller relative to these, so that in operation the third and the fourth gears 40, 50 rotate at the same speed.

Finally a further transmission takes place from the fourth gears 50 to a fifth gear 60 that is arranged coaxially to the first gear 20 and that is firmly connected to a shaft 70, it being possible for the shaft 70 to be arranged as drive or output shaft 70.

If the shaft 70 is for example used as drive shaft 70 for a wind turbine the drive shaft 70 thus corresponds to the rotor shaft of the wind turbine or is at least connected thereto—the rotational motion of the drive shaft 70 is transmitted to the first first gear 20 in the direction opposite to the sequence described above.

According to the invention there are arranged on the first gear 20 three pinions 80 arranged in the shape of an imaginary isosceles triangle, of one electric machine each designed as generator 90, that can in each case be employed for producing electricity. It is basically a force transmission that takes place from the drive shaft 70 to three output shafts, i.e. the three drives of the generators 90.

If, however, the electric machines 90 are designed as motors 90, the motors 90 are used for driving the first gear 20 and thus eventually for driving the output shaft 70. Basically a force transmission takes place here from three drive shafts, i.e. three motors 90, to an output shaft 70.

However, the force transmission described above in principle, does not have to mean that all three generators or motors are simultaneously operated at each point in time. Rather a control system is provided with the machines that exhibits the transmission system according to the invention, that can switch the generators or motors on or off.

In a wind turbine it may be provided that depending on the amount of wind, one, two or three generators feed electricity into the grid. Conversely, for example in the case of machines where the shaft 70 is used as output, one, two or three motors are used for driving for achieving a specific power of the machine.

Even though three electric machines 80 and three gear pairs formed by the third and fourth gears 40, 50 are particularly advantageous on account of load distribution, further electric machines that cooperate with the first gear 20 and/or further gear pairs that mesh with the second gear 30 are conceivable.

The toothings of the gears 20, 30, 40, 50, 60 with each other and/or with the pinions 80 of the electric machines 90 preferably take place as a helical toothing, the gears 20, 30, 40, 50, 60 and/or the pinions 80 particularly preferably being designed having a helical toothing.

The exemplary embodiment that has been shown is particularly preferable with a view to mounting the first transmission stage, i.e. mounting the first and second gears 20, 30. The first gear 20 and the second gear 30, that is firmly connected thereto, are arranged on their one side in a wall (not shown) of the transmission system and on their other side in a bearing arranged in the fifth gear 60 (indicated with an *). The first and second gears 20, 30 are mounted in the fifth gear 60 in such a way that the first and second gears 20, 30 and the fifth gear 60 and/or the drive or output shaft 70 can rotate independently from each other.

The advantage of this design is that misalignments in the gear toothing or non-uniformly occurring loads be accommodated so that larger manufacturing tolerances can be employed without too great a risk of wear.

In a further embodiment of preferred design the three pinions 80 that form an imaginary isosceles triangle and mesh with the outer toothing of the first gear 20, of the electric machines 90 are offset, in particular arranged rotated by 60°, relative to the three third gears 40 that form an imaginary isosceles triangle and mesh with the second gear 30. This design provides for quiet synchronism of the transmission system.

The transmission system according to the invention can be utilised in different machines. So, for example, use in wind turbines or in machine tools is also conceivable.

The invention claimed is:

1. A transmission system having a transmission-system wall and a plurality of externally toothed gears comprising:
    a first gear,
    a plurality of pinions, each connected to an electric machine designed as a generator or motor and meshing with the first gear, characterised in that the plurality of pinions includes three pinions forming an imaginary isosceles triangle,
    a second gear firmly connected coaxially to the first gear,
    three third gears forming an imaginary isosceles triangle and meshing with the second gear, characterised in that the imaginary isosceles triangle formed by the three pinions is offset by 60° relative to the imaginary isosceles triangle formed by the three third gears,
    three fourth gears, each firmly connected coaxially to a respective one of the third gears, and
    a fifth gear that meshes with the fourth gears and is connected to a drive or output shaft,
    wherein the first gear, the second gear, the fifth gear and the drive or output shaft are arranged coaxially.

2. The system according to claim 1, characterised in that three electric machines are provided whose pinions are arranged offset by 60° relative to the third gears.

3. The transmission system according to claim 1, characterised in that the first and second gears are arranged between the transmission-system wall and a bearing arranged in the fifth gear.

4. The transmission system according to claim 1, characterised in that the transmission system is part of a wind turbine.

5. The transmission system according to claim 2, characterised in that the first and second gears are arranged between the transmission-system wall and a bearing arranged in the fifth gear.

6. The transmission system according to claim 2, characterised in that the transmission system is part of a wind turbine.

7. The transmission system according to claim 3, characterised in that the transmission system is part of a wind turbine.

8. The transmission system according to claim 1, characterised in that the first gear is externally toothed.

9. The transmission system according to claim 8, characterised in that the second gear, the three third gears, the three fourth gears and the fifth gear are externally toothed.

10. The transmission system according to claim 8, characterised in that each of the plurality of pinions is externally toothed.

11. The transmission system according to claim 1, characterised in that the fifth gear directly contacts the three fourth gears.

12. The transmission system according to claim 11, characterised in that the second gear directly contacts the three third gears.

13. The transmission system according to claim 11, characterised in that each of the plurality of pinions directly contacts the first gear.

14. The transmission system according to claim 1, characterised in that the fifth gear has an axis of rotation and the axis of rotation is coaxial with the first gear, the second gear and the drive or output shaft.

\* \* \* \* \*